US010933797B2

(12) United States Patent
Talbot

(10) Patent No.: US 10,933,797 B2
(45) Date of Patent: Mar. 2, 2021

(54) CARGO BAR RETAINER

(71) Applicant: Kevin Talbot, Oliver (CA)

(72) Inventor: Kevin Talbot, Oliver (CA)

( * ) Notice: Subject to any disclaimer, the term of this patent is extended or adjusted under 35 U.S.C. 154(b) by 0 days.

(21) Appl. No.: 15/880,431

(22) Filed: Jan. 25, 2018

(65) Prior Publication Data

US 2019/0225138 A1    Jul. 25, 2019

(51) Int. Cl.
| | | |
|---|---|---|
| *B60P 7/08* | (2006.01) |
| *B60P 7/12* | (2006.01) |
| *B60P 7/15* | (2006.01) |
| *B60R 5/00* | (2006.01) |
| *B65D 67/02* | (2006.01) |
| *B62D 33/02* | (2006.01) |
| *B65D 19/44* | (2006.01) |
| *B65D 90/00* | (2006.01) |
| *B65D 85/20* | (2006.01) |
| *F16B 7/14* | (2006.01) |
| *F16B 7/10* | (2006.01) |

(52) U.S. Cl.
CPC .............. *B60P 7/12* (2013.01); *B60P 7/0815* (2013.01); *B60P 7/0892* (2013.01); *B60P 7/15* (2013.01); *B60R 5/006* (2013.01); *B62D 33/0207* (2013.01); *B65D 19/44* (2013.01); *B65D 67/02* (2013.01); *B65D 85/20* (2013.01); *B65D 90/0053* (2013.01); *B65D 90/0073* (2013.01); *F16B 7/105* (2013.01); *F16B 7/1454* (2013.01)

(58) Field of Classification Search
CPC .. B60P 7/12; B60P 7/15; B60P 7/0815; B60P 7/0892; B65D 90/0053; B65D 90/0073; B65D 85/20; B65D 19/44; B65D 67/02; B60R 5/006; B62D 33/0207; F16B 7/105; F16B 7/1454
USPC ......... 410/32, 34–36, 42, 89, 104, 105, 120, 410/130, 132, 139, 140–145, 121, 410/149–150, 152–153; 211/7, 60.1, 103, 211/105.3, 190, 192, 187, 208, 94.02, 211/123; 224/404, 405, 501, 551, 552, 224/567; 248/125.1, 125.3, 219.1, 333, 248/354.1, 354.6, 220.41, 220.43, 221.11
See application file for complete search history.

(56) References Cited

U.S. PATENT DOCUMENTS

| | | | | |
|---|---|---|---|---|
| 4,650,383 | A | * | 3/1987 | Hoff .......................... B60P 7/15 410/149 |
| 5,094,576 | A | | 3/1992 | Fredelius |
| 5,104,269 | A | * | 4/1992 | Hardison ............... B61D 45/00 410/145 |

(Continued)

*Primary Examiner* — Stephen T Gordon
(74) *Attorney, Agent, or Firm* — Orin Del Vecchio

(57) ABSTRACT

An apparatus and method for securing objects to a transportation trailer wall. The apparatus comprises an elongate rigid member extending between first and second ends and a first E-Track connector at the first end of the elongate rigid member. The apparatus further comprises a second E-Track connector at the second end of the elongate rigid member and a collar slidably moveable along the elongate rigid member having a lock adapted to selectably lock the collar at a desired location therealong. The method comprises securing the apparatus to the trailer wall, locating at least one object to be secured between the elongate rigid member and the trailer wall, slideably positioning a collar along the elongate rigid member to secure the at least one object and engaging a lock on the collar to fix the location of the collar.

3 Claims, 4 Drawing Sheets

(56) References Cited

U.S. PATENT DOCUMENTS

| | | | |
|---|---|---|---|
| 5,405,226 A * | 4/1995 | Daves | B60P 7/15 410/32 |
| 5,516,245 A | 5/1996 | Cassidy | |
| 5,807,047 A * | 9/1998 | Cox | B60P 7/15 410/143 |
| 5,997,228 A | 12/1999 | Potter | |
| 6,210,090 B1 | 4/2001 | Wyse | |
| 6,368,037 B1 | 4/2002 | Oliviero | |
| 6,733,220 B2 | 5/2004 | Brown | |
| 6,755,600 B2 | 6/2004 | Scott | |
| 8,202,029 B2 | 6/2012 | Chou | |
| 8,690,503 B2 * | 4/2014 | Chamoun | B60P 7/15 410/121 |
| 9,254,780 B2 | 2/2016 | Hernandez | |
| 9,346,392 B1 * | 5/2016 | Neal | B60P 7/0815 |
| 2011/0142564 A1 | 6/2011 | Kaburick | |
| 2012/0230795 A1 | 9/2012 | Hernandez | |
| 2013/0064621 A1 | 3/2013 | Wang | |
| 2013/0136556 A1 | 5/2013 | Bose | |
| 2014/0369782 A1 | 12/2014 | Reid | |

\* cited by examiner

CARGO BAR RETAINER

BACKGROUND OF THE INVENTION

1. Field of Invention

The present invention relates generally to securing objects to a transport trailer wall, and in particular to a cargo retainer used to secure elongate cargo between standard E-Track rails.

2. Description of Related Art

A wide variety and quantity of items are commonly shipped by containers including transportation trailers as are commonly known as tractor trailers. Such trailers commonly comprise an elongate rectangular shaped enclosed storage area which are accessed at the rear for loading and unloading. In order to provide flexibility of the storage and loading of such trailers, load bars and other objects are commonly used to assist in securing loads within the trailer.

Load bars are required to be stored within the trailer when not in use. Disadvantageously, such load bars may be prone to damage by impacts within the trailer when left loose therein or damaged by works or forklifts during loading and unloading. Load bars may also be removed from the trailer to get them out of the way during loading and loading, thus they may be forgotten on a loading dock if they are not securely stored. It is therefore desirable to store such load bars in a location which prevents such damage and ensures they are not left behind.

Current methods for storing load bars has not been satisfactory. In particular, ropes or cords may often be used to secure the load bars to the wall of the trailer. However such ropes may not be sufficiently strong enough to prevent sliding of the load bars as they only provide a flexible structure. Additionally, ropes and cords are required to be secured to an object on the wall of the trailer. It is common to provide track systems in the wall of such trailers, such as by way of non-limiting example, an E-Track system which includes tracks at designated spacing. It will be appreciated that as the rope or cord extends between these E-Track spacings, load bar groupings have less width than such E-Track spacing and therefore will still be permitted significant movement which reduces the effectiveness of such methods in preventing damage to the load bars.

SUMMARY OF THE INVENTION

According to a first embodiment of the present invention there is disclosed an apparatus for securing objects to a transportation trailer wall comprising an elongate rigid member extending between first and second ends and a first E-Track connector at the first end of the elongate rigid member. The apparatus further comprises a second E-Track connector at the second end of the elongate rigid member and a collar slideably moveable along the elongate rigid member having a lock adapted to selectably lock the collar at a desired location therealong.

The collar may include a protrusion extending in the same direction as the first and second E-Track connectors. The lock may comprise a pad frictionally engageable against the elongate rigid member. The pad may be located at a distal end of a lever arm. The lever arm may be pivotably supported on the collar. The lever arm may include a handle for rotating the lever arm into a locked position and a release position.

The first and second E-Track connectors may extend perpendicularly from the elongate rigid member. The first and second E-Track connectors may space the elongate rigid member away from a wall of the trailer by a gap distance. The gap distance may be selected to be between 1.5 and 6 inches.

The first E-Track connector may be hingedly connected to the elongate rigid member. The second E-Track connector may be selectable releasable connected to the elongate rigid member. The second E-Track connector may be coupled to the elongate rigid member with a pin coupler.

The elongate rigid member may be lengthenable. The elongate rigid member may be formed of inner and outer telescoping members. The inner and outer telescoping members may be selectably fixed to each other with a spring pin.

According to a further embodiment of the present invention there is disclosed a method for securing objects to a transportation trailer wall comprising providing an elongate rigid member extending between first and second end, securing a first E-Track connector at the first end of the elongate rigid member to an E-Track rail on a trailer wall and securing a second E-Track connector at the second end of the elongate rigid member to an E-Track rail on the trailer wall. The method further comprises locating at least one object to be secured between the elongate rigid member and the trailer wall, slideably positioning a collar along the elongate rigid member to secure the at least one object and engaging a lock on the collar to fix the location of the collar.

The method may further comprise rotating the elongate rigid member into engagement with the second E-Track connector after engaging the first E-Track connector. The method may further comprise telescopingly adjusting the length of the elongate rigid member prior to engaging with the trailer wall.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
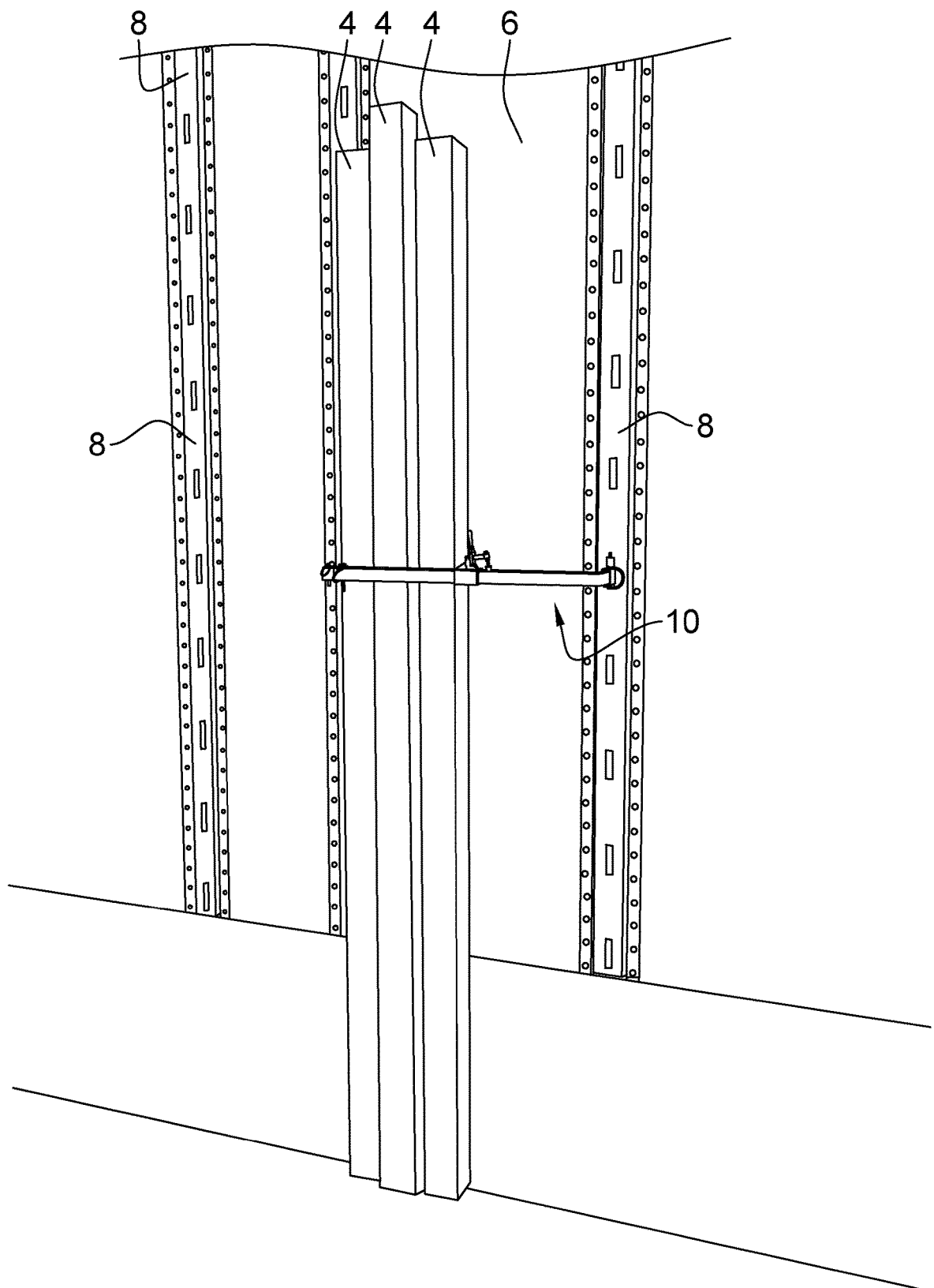
FIG. 1 is a perspective view of an apparatus for securing objects to a transport trailer wall, secured to vertical E-Track rails within a transport trailer, with a plurality of elongate cargo members secured therebetween.

Referring to FIG. 1, an apparatus for securing objects to a transport trailer wall according to a first embodiment of the invention is shown generally at 10. The apparatus 10 is secured to vertical E-Track rails 8, as are commonly known, on a transport trailer wall 6. A plurality of elongate cargo members 4 are retained between the apparatus 10 and the wall 6. Although the apparatus 10 is illustrated as being attached to vertical E-Track rails 8, it will be appreciated that a horizontal E-Track rail, as is commonly known, may be utilized, as well. The elongate cargo members 4 may be such as, by way of non-limiting example, load bars, pipes, elongate wood boards, gutters, rebar or any other elongate objects.

Figure 2:
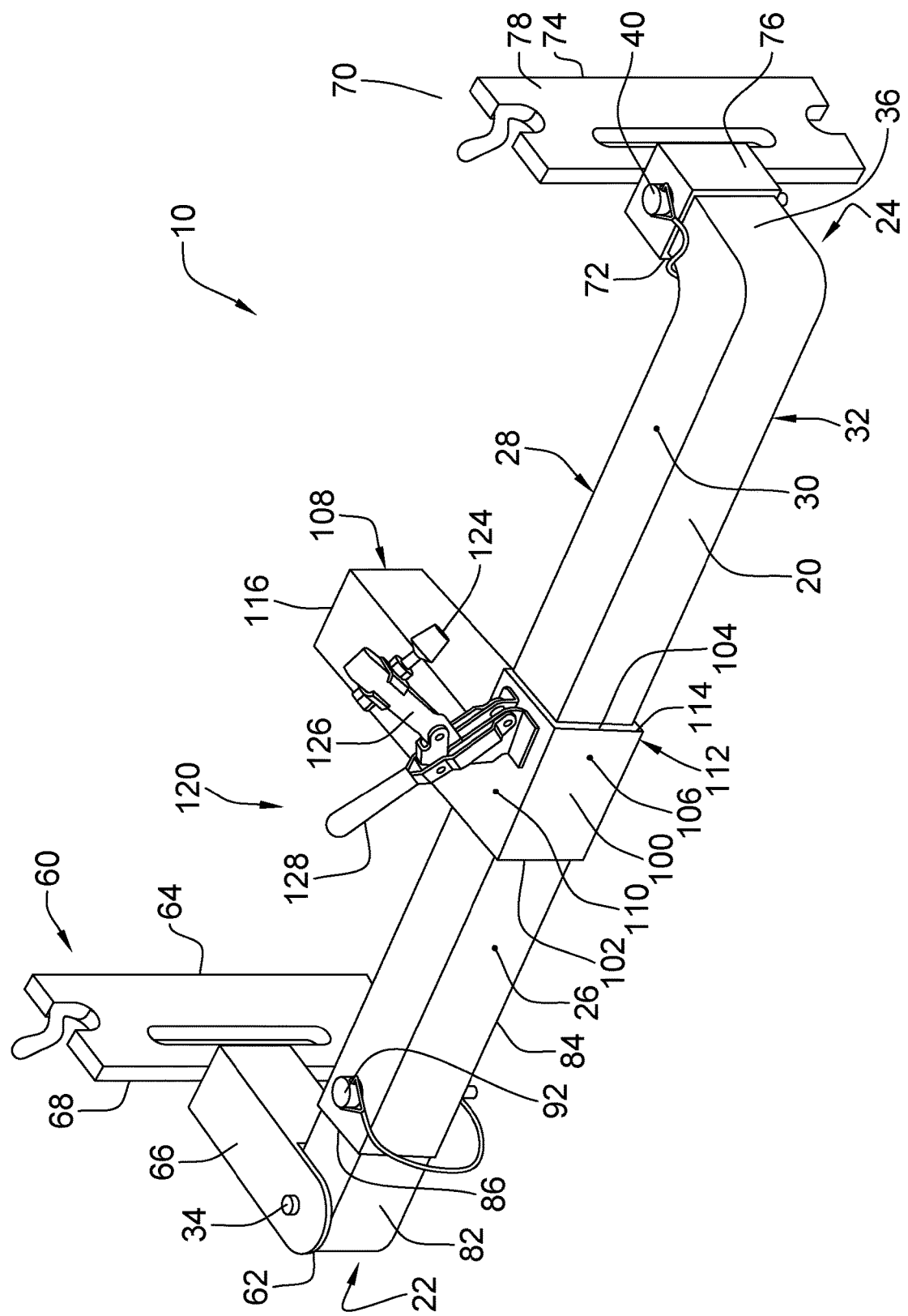
FIG. 2 is a perspective view of the apparatus of FIG. 1, with the collar in a moveable position.
Figure 3:
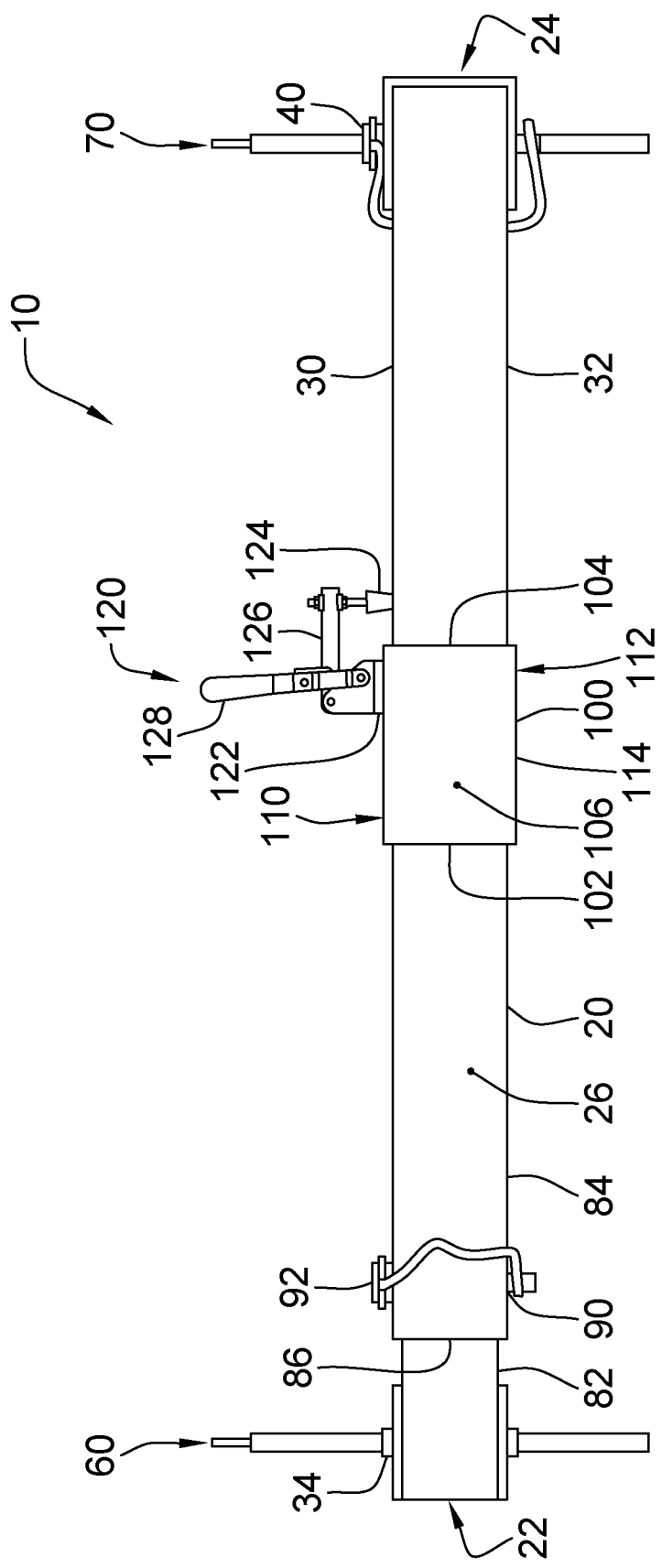
FIG. 3 is a front view of the apparatus of FIG. 1, with the collar in a locked position.
Figure 4:
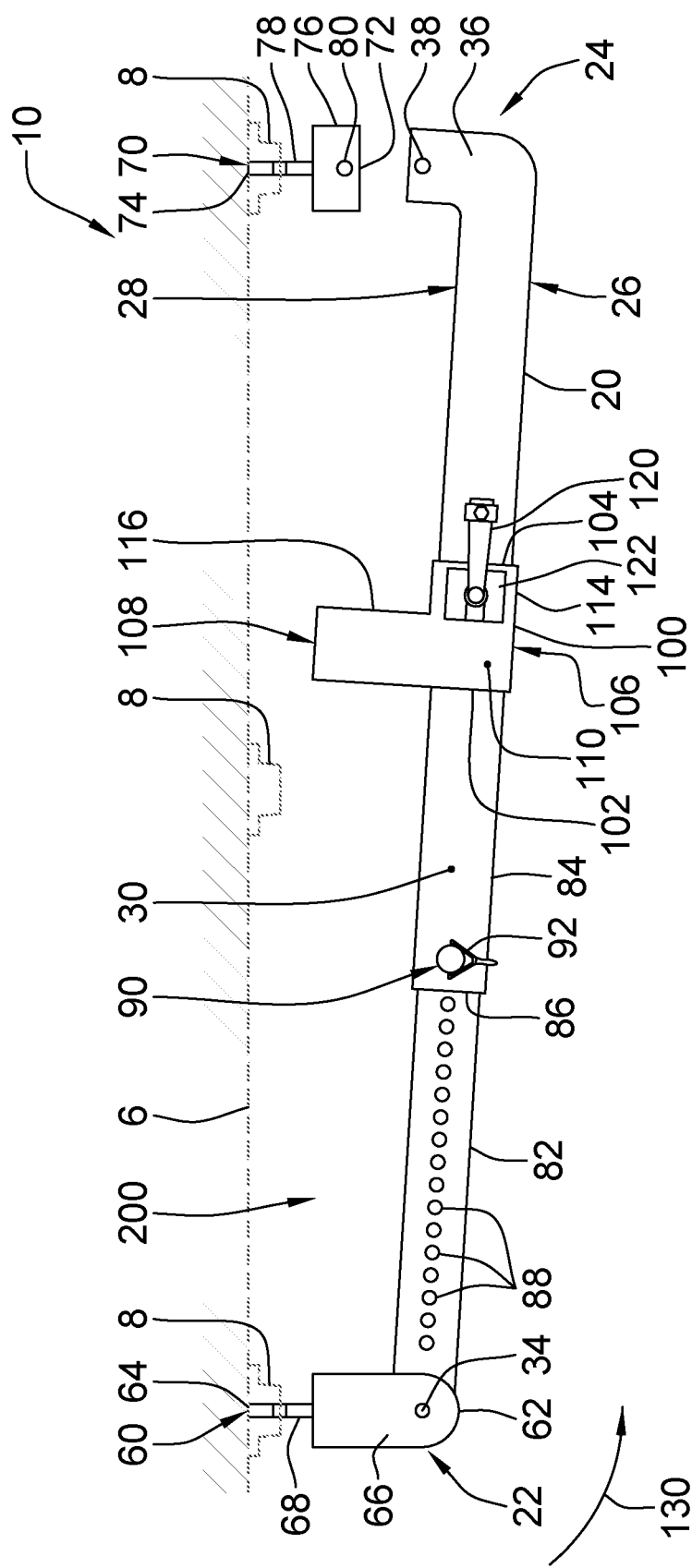
FIG. 4 is a top view of the apparatus of FIG. 1, in an extended pivot position.

Turning now to FIGS. 2, 3 and 4, the apparatus 10 includes an elongate rigid member 20 with a slideable collar 100 thereon. The elongate rigid member 20 is joined to first and second E-Track connectors, 60 and 70, respectively, to secure the apparatus 10 to the E-Track rails 8, as illustrated in FIG. 1. The slideable collar 100 includes a lock 120 to selectably lock the collar 100 at a desired location on the elongate rigid member 20, as will be set out in further detail below.

The elongate rigid member 20 extends between first and second ends, 22 and 24, respectively, and has front and rear surfaces, 26 and 28, respectively, and top and bottom surfaces, 30 and 32, respectively. The elongate rigid member 20 is illustrated as having a square cross-section, although it will be appreciated that other cross-sectional shapes may be utilized as well, such as, by way of non-limiting example, rectangular. The elongate rigid member 20 includes a hinge pin 34, as is commonly known, extending therethrough between the top and bottom surfaces, 30 and 32, proximate to the first end 22, to pivotably join the first end 22 of the elongate rigid member 20 to the first E-Track connector 60, as will be set out below. The second end 24 includes a 90° bend portion 36 with a coupling bore 38 extending therethrough between the top and bottom surfaces 30 and 32, as best seen on FIG. 4. The bend portion 36 may be selectively secured to the second E-Track connector 70 with a pin coupler 40 through the coupling bore 38, as best seen on FIG. 2, and as will be set out further below. Although the bend portion 36 is illustrated as a bent bar, it will be appreciated that the bend portion 36 may also be formed by other methods, such as, by way of non-limiting example, by welding two bars together, forming an "L"-shape bend portion.

The first E-Track connector 60 extends perpendicularly from the first end 22 of the elongate rigid member 20, between front and rear edges, 62 and 64, respectively. The first E-Track connector 60 includes a pivot portion 66 extending from the front edge 62 and a standard E-Fitting portion 68 extending from the rear edge 64. The first end 22 of the elongate rigid member 20 is received within the pivot portion 66 proximate to the front edge 62 and is pivotably secured thereto with the hinge pin 34, as best illustrated in FIG. 2. The E-Fitting portion 68 is a standard spring E-Fitting, as is commonly known in the art, and is designed for use with Series E tracks.

The second E-Track connector 70 extends perpendicularly from the second end 24 of the rigid member 20, between front and rear edges, 72 and 74, respectively, and is parallel to and spaced apart from the first E-Track connector 60. The second E-Track connector 70 includes a coupling portion 76 extending from the front edge 72 and a standard E-Fitting portion 78 extending from the rear edge 74. The coupling portion 76 is tubular and is selected to receive the bend portion 36 at the second end 24 of the rigid member 20 therein. A coupling bore 80 extends through the coupling portion 76 proximate to the front edge 72, as seen on FIG. 4, and is aligned with the coupling bore 38 when the bend portion 36 is inserted into the coupling portion 76. As best seen on FIG. 2, the pin coupler 40 extends through the coupling bores 38 and 80 to secure the elongate rigid member 20 to the second E-Track connector 70. The E-Fitting portion 78 of the second E-Track connector 70 is a standard spring E-Fitting, as outlined above for the first E-Track connector 60.

Referring now to FIG. 4, the elongate rigid member 20 may be extendable in length by utilizing inner and outer telescoping members, as is commonly known. The elongate rigid member 20 is comprised of an inner member 82 extending from the first end 22 and an outer member 84 extending from the second end 24 to an open end 86. The outer member 84 is tubular and is selected to receive the inner member 82 therein through the open end 86. The inner member 82 includes a plurality of spaced apart length adjustment bores 88 therethrough between the top and bottom surfaces 30 and 32. The outer member 84 includes a length retention bore 90 which extends between the top and bottom surfaces 30 and 32 proximate to the open end 86 and is selected to align with the length adjustment bores 88. The inner member 82 slides within the outer member 84 and is secured to a desired length with a spring pin 92 extending through the aligned length retention bore 90 and one length adjustment bore 88.

Referring again to FIGS. 2, 3 and 4, the collar 100 extends between first and second ends, 102 and 104, respectively, and between front and rear, 106 and 108, respectively, and has top and bottom surfaces, 110 and 112, respectively. The collar 100 is comprised of a tubular slideable portion 114 at the front 106 and a retainment protrusion 116 extending to the rear 108. The tubular slideable portion 114 is selected to slideably receive the outer member 84 of the elongate rigid member 20 therethrough, and may be slideably moved to a desired location on the outer member 84, the purpose of which will be set out below. The retainment protrusion 116 extends perpendicularly from the tubular slideable portion 114, parallel to the first and second E-Track connectors, 60 and 70. The length of the retainment protrusion 116 is selected such that the rear 108 is positioned proximate to the wall 6 when in an installed position, with sufficient clearance to allow for an E-Track rail 8 to be located between the rear 108 and the wall 6. A cargo gap 200 is formed between the first E-Track connector 60 and the first end 102 of the retainment protrusion 116 and between the rear surface 28 of the elongate rigid member 20 and the wall 6. It will be appreciated that the cargo gap 200 is sized to receive the elongate cargo members 4 therein such as, by way of non-limiting example, between 1.5 and 6 inches (38 and 152 mm) although it the apparatus may also be sized to receive other objects by suitably sizing the gap 200 to be larger or smaller depending upon the size of the object.

The lock 120 is secured to the top surface 110 on the tubular slideable portion 114 of the collar 100 proximate to the second end 104. The illustrated lock 120 is a toggle clamp, as is commonly known, although other means of locking the collar 100 to the elongate rigid member 20 may be utilized, as well. The lock 120 comprises a base 122 secured to the collar 100, with a pad 124 located at a distal end of a lever arm 126 pivotably connected to a handle 128. To slide the collar 100 along the elongate rigid member 20, the handle 128 is in a lowered position, as illustrated in FIG. 2, which raises the pad 124. To secure the collar 100 to the elongate rigid member 20, the handle 128 is raised to the position illustrated in FIG. 3, lowering the pad 124 such that it is engaged upon the top surface 30 of the elongate rigid member 20. When the pad 124 is engaged upon the top surface 30, the collar 100 is retained in position on the elongate rigid member 20.

To utilize the apparatus 10, the first and second E-Track connectors 60 and 70 are engaged within the E-Track rails 8. To extend between two adjacent vertical E-Track rails, the outer member 84 is positioned with the inner member 82 retained therein such that the length adjustment bore 88 proximate to the first end 22 is aligned with the length retention bore 90, as illustrated in FIGS. 2 and 3. To span over three E-Track rails 8, as illustrated in FIG. 4, the elongate rigid member 20 is extended to its full length, exposing a plurality of length adjustment bores 88 to align the second E-Track connector 70 with the selected E-Track rail 8. The collar 100 is positioned proximate to the second end 24.

Once the apparatus 10 has been connected to the E-Track rails 8, the pin coupler 40 is removed such that the second end 24 of the elongate rigid member 20 is disconnected from the second E-Track connector 70, and the elongate rigid member 20 is pivoted about the hinge pin 34 at the first end 22, opening the apparatus 10 to allow for elongate cargo members 4 to be positioned against the wall, proximate to the first end 22, within the cargo gap 200.

With the cargo members 4 located against the wall proximate to the first end 22, the elongate rigid member 20 is pivoted about the hinge pin 34 in the direction indicated at 130 on FIG. 4. The bend portion 36 of the second end 24 is received within the second E-Track connector 70 and secured in place with the pin coupler 40.

The handle 128 is lowered into the position illustrated in FIG. 2 such that the collar 100 may be moved along the elongate rigid bar 20 to a position such that the first end 102 of the retainment protrusion portion 116 engages upon the cargo members 4. The handle 128 is then raised to the position illustrated in FIG. 3 such that the pad 124 engages upon the top surface 30 of the elongate rigid member 20, locking the collar 100 in place, and securing the cargo members 4 within the cargo gap 200.

While specific embodiments of the invention have been described and illustrated, such embodiments should be considered illustrative of the invention only and not as limiting the invention as construed in accordance with the accompanying claims.

What is claimed is:

1. A method for securing objects to a transportation trailer wall comprising:
    providing an elongate rigid member extending between first and second ends;
    securing a first E-Track connector at said first end of said elongate rigid member to an E-Track rail on a trailer wall;
    securing a second E-Track connector at said second end of said elongate rigid member to an E-Track rail on said trailer wall;
    locating at least one object to be secured between said elongate rigid member and said trailer wall;
    slideably positioning a collar along said elongate rigid member to secure said at least one object; and
    engaging a lock on said collar to fix said a location of said collar.

2. The method of claim 1 further comprising rotating said elongate rigid member into engagement with said second E-Track connector after engaging said first E-Track connector.

3. The method of claim 1 further comprising telescopingly adjusting the length of said elongate rigid member prior to engaging with said trailer wall.

* * * * *